(No Model.)

G. H. DAY.
WHEEL FOR VELOCIPEDES.

No. 344,442. Patented June 29, 1886.

WITNESSES.
Stedman Buttrick
E. P. J. Moorton

INVENTOR.
George H. Day
By Charles E. Pratt
Atty

UNITED STATES PATENT OFFICE.

GEORGE H. DAY, OF HARTFORD, CONNECTICUT, ASSIGNOR TO THE POPE MANUFACTURING COMPANY, OF SAME PLACE.

WHEEL FOR VELOCIPEDES.

SPECIFICATION forming part of Letters Patent No. 344,442, dated June 29, 1886.

Application filed November 30, 1885. Serial No. 184,232. (No model.)

*To all whom it may concern:*

Be it known that I, GEORGE H. DAY, of the city of Hartford, in the State of Connecticut, have invented a new and useful Improvement in the Construction of Wheels for Velocipedes and other Vehicles, of which the following is a specification.

My improvement relates more especially to that class of wheels known as "suspension-wheels," and particularly to those having hollow metallic rims.

My method of making a hollow rim is to take sheet-steel and cut it in two strips for each rim, of suitable length, one strip wide and the other strip narrow, and the narrow one may be of the same gage or of lighter or heavier gage than the wide one. I then draw these two strips through dies together, forming them into a tube in which the two edges of the wider strip are butted together and the narrower strip laps the seam, and in which the wider strip is depressed on either side the seam to an amount equal to the thickness of the narrow strip, and for a breadth equal to the width of the narrow strip, and the narrow strip lies with an exact fit in this depression on the outside of the tube so formed, making a flush and continuous cylindrical surface with the larger strip.

Figure 1:
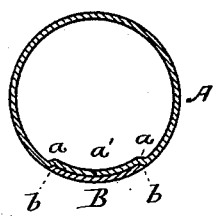

Figure 1 shows in section these two strips in their proper position and shape as drawn into a tube by my process, A being the wider strip, *a a* being the points of depression to the thickness of the narrow strip, and *a'* being the butted seam, and B is the narrower strip, with its edges *b b* fitting the depression in the wider strip, as shown, and making an apparent like seam at each side of the strip B. This drawing of the two strips through the same dies at the same time makes a close fit for brazing, and I then braze the two strips together. If the tube is found too soft after brazing, it can be drawn through a round die to stiffen the stock, and this for the purpose of a felly is desirable, as the process of brazing softens the already-stiffened sheet-metal stock in a manner that may best be corrected by further drawing. The tube thus formed has an outer surface nearly as perfect as that of a weldless drawn steel tube, which is much more difficult and expensive of construction, and the brazing is much better done than if the strengthening-piece B were placed on the outside of the tube without being set in, and the strain in use is much less. Again, the tube after brazing can be more evenly tempered by drawing than any other rim made of sheet metal with brazed seam with which I am acquainted, and the bearing on the dies as it is worked is much more uniform. When I have formed the two pieces into a tube, as already described, I pass them through the rolls for coiling into a rim and form the side opposite to that strengthened by the narrower piece B, so as to receive the tire, giving the tube B the desired section for a rim, brazing or otherwise fastening the two ends together to form a perfect ring.

Figure 2:
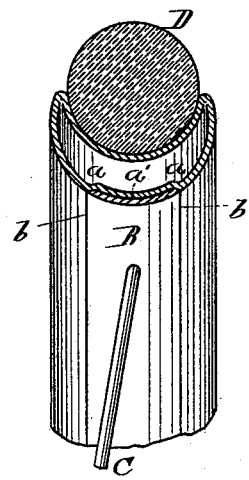

Fig. 2 shows in section and part elevation my completed rim, in which A is the wider piece of sheet metal. *a a* are the inward bends formed by the depression of the narrower strip. *a'* is the butted joint. B is the narrower strip, and *b b* are edges of the narrower strip, forming an apparent though almost hidden seam on either side. C is one of a series of spokes, and D is the tire. In constructing a hollow rim this way, considerable economy in manfacture is found, and a much more uniform and desirable result is obtained, for the reason, among other things, that, the under side and narrower strip being set into and flush with the other, no guides are required for holding the strip in place while brazing, or while subsequently forming the tube into the completed rim. The rim has also a smooth exterior contour for receiving any desired finish, requires no solder for concealing the seams, and is especially well stiffened at the inner side for the draw of the spokes and to resist buckling.

I am aware that a hollow felly has heretofore been described and shown consisting in a single strip of sheet metal worked into the form of a rim with the edges butted together, flushed, and with a re-enforce or added strip placed over the same and brazed, the piece being exterior to the general contour of the rim or felly. I therefore do not broadly claim a hollow felly constructed of a single strip of sheet metal with the edges brazed; nor a hollow felly consisting of a single strip of sheet metal with the edges butted together and the seam covered by a strengthening-strip on the outside.

I claim as new and of my invention—

The described hollow rim for velocipedes or other vehicles, constructed of two strips of sheet-steel formed and shaped together, the wider one with a depression to receive the narrower one, and the narrower one lapping the seam in the wider one and flush with the latter on the inner or spoke side of the rim, brazed thereto and stiffened therewith, essentially as set forth.

GEORGE H. DAY.

Witnesses:
CHAS. L. BURDETT,
WM. EDGAR SIMONDS.